United States Patent
Peterson et al.

(10) Patent No.: US 8,203,531 B2
(45) Date of Patent: Jun. 19, 2012

(54) VECTOR-SPECIFIC HAPTIC FEEDBACK

(75) Inventors: Cody George Peterson, Coeur d'Alene, ID (US); Andrew Parris Huska, Post Falls, ID (US); James William Schlosser, Spokane, WA (US); Douglas M. Krumpelman, Hayden, ID (US)

(73) Assignee: Pacinian Corporation, Spokane, WA (US)

( * ) Notice: Subject to any disclaimer, the term of this patent is extended or adjusted under 35 U.S.C. 154(b) by 524 days.

(21) Appl. No.: 12/403,270

(22) Filed: Mar. 12, 2009

(65) Prior Publication Data
US 2009/0231277 A1 Sep. 17, 2009

Related U.S. Application Data

(60) Provisional application No. 61/036,735, filed on Mar. 14, 2008.

(51) Int. Cl.
*G06F 3/033* (2006.01)
(52) U.S. Cl. ...................... 345/157; 340/407.2
(58) Field of Classification Search .................. None
See application file for complete search history.

(56) References Cited

U.S. PATENT DOCUMENTS

| | | | |
|---|---|---|---|
| 4,200,778 A | 4/1980 | Bovio et al. |
| 4,529,849 A | 7/1985 | Kamei et al. |
| 5,057,657 A | 10/1991 | Skulic |
| 5,239,152 A | 8/1993 | Caldwell et al. |
| 5,612,692 A | 3/1997 | Dugas et al. |
| 5,676,476 A | 10/1997 | Uke |
| 5,729,222 A | 3/1998 | Iggulden et al. |
| 5,943,233 A | 8/1999 | Ebina et al. |
| 6,003,390 A | 12/1999 | Cousy |
| 6,218,966 B1 | 4/2001 | Goodwin et al. |
| 6,684,166 B2 | 1/2004 | Bellwood et al. |
| 6,791,480 B1 | 9/2004 | Uke |
| 7,166,795 B2 | 1/2007 | Lengeling |
| 7,182,691 B1 | 2/2007 | Schena |
| 7,196,688 B2 | 3/2007 | Schena |
| 7,339,572 B2 | 3/2008 | Schena |
| 7,342,573 B2 | 3/2008 | Ryynanen |
| 7,741,979 B2 | 6/2010 | Schlosser et al. |
| 7,834,857 B2 | 11/2010 | Prados |
| 2002/0054060 A1 | 5/2002 | Schena |
| 2002/0149561 A1 | 10/2002 | Fukumoto et al. |

(Continued)

FOREIGN PATENT DOCUMENTS

DE 19704253 8/1998

(Continued)

OTHER PUBLICATIONS

"Haptics: Learning Through Touch", Retrieved from <http://ced.ncsu.edu/nanoscale/haptics.htm>, (2004), 5 pages.

(Continued)

*Primary Examiner* — Paul Huber

(57) ABSTRACT

In one or more embodiments, vector-specific movement can be imparted to a user interface device (UID) to provide vector-specific haptic feedback. In at least some embodiments, this vectored movement can be based on input received by the UID. The input can include information associated with the user's interaction with an associated device integrated with or communicatively linked with the UID, and or with an application implemented on the associated device. In at least some embodiments, the UID can be configured with a controller, a microprocessor(s), and a vector-specific actuator that includes an electrically-deformable material.

29 Claims, 4 Drawing Sheets

U.S. PATENT DOCUMENTS

| | | |
|---|---|---|
| 2003/0208324 A1 | 11/2003 | Bellwood et al. |
| 2003/0209131 A1 | 11/2003 | Asahi |
| 2004/0031673 A1 | 2/2004 | Levy |
| 2004/0085716 A1 | 5/2004 | Uke |
| 2004/0130526 A1 | 7/2004 | Rosenberg |
| 2004/0252104 A1 | 12/2004 | Nakamura et al. |
| 2005/0017947 A1 | 1/2005 | Shahoian et al. |
| 2005/0157893 A1 | 7/2005 | Pelrine et al. |
| 2005/0204906 A1 | 9/2005 | Lengeling |
| 2005/0237309 A1 | 10/2005 | Sharma |
| 2006/0256075 A1 | 11/2006 | Anastas et al. |
| 2006/0261983 A1 | 11/2006 | Griffin et al. |
| 2006/0267949 A1 | 11/2006 | Rosenberg |
| 2007/0091070 A1 | 4/2007 | Larsen et al. |
| 2007/0146317 A1 | 6/2007 | Schena |
| 2007/0152974 A1 | 7/2007 | Kim |
| 2007/0193436 A1 | 8/2007 | Chu |
| 2007/0203011 A1 | 8/2007 | Gudgel et al. |
| 2007/0234887 A1 | 10/2007 | Sawada et al. |
| 2007/0234890 A1 | 10/2007 | Yamashita |
| 2007/0236449 A1 | 10/2007 | Lacroix |
| 2007/0236450 A1 | 10/2007 | Colgate et al. |
| 2007/0251810 A1 | 11/2007 | Corcoran et al. |
| 2007/0285284 A1 | 12/2007 | Matteo et al. |
| 2008/0010593 A1 | 1/2008 | Uusitalo et al. |
| 2008/0042978 A1 | 2/2008 | Perez-Noguera |
| 2008/0060856 A1 | 3/2008 | Shahoian et al. |
| 2008/0062144 A1 | 3/2008 | Shahoian et al. |
| 2008/0062145 A1 | 3/2008 | Shahoian et al. |
| 2008/0083314 A1 | 4/2008 | Hiyashi et al. |
| 2008/0084384 A1 | 4/2008 | Gregorio et al. |
| 2008/0092720 A1 | 4/2008 | Yamashita et al. |
| 2008/0198139 A1 | 8/2008 | Lacroix et al. |
| 2008/0223706 A1 | 9/2008 | Hagiwara et al. |
| 2008/0251364 A1 | 10/2008 | Takala et al. |
| 2008/0289952 A1 | 11/2008 | Pelrine et al. |
| 2008/0303782 A1 | 12/2008 | Grant et al. |
| 2009/0002199 A1 | 1/2009 | Lainonen et al. |
| 2009/0002205 A1 | 1/2009 | Klinghult et al. |
| 2009/0008234 A1 | 1/2009 | Tolbert et al. |
| 2009/0085878 A1 | 4/2009 | Heubel et al. |
| 2009/0085882 A1 | 4/2009 | Grant et al. |
| 2009/0106655 A1 | 4/2009 | Grant et al. |
| 2009/0135142 A1 | 5/2009 | Fu et al. |
| 2009/0160763 A1 | 6/2009 | Cauwels et al. |
| 2009/0167704 A1 | 7/2009 | Terlizzi et al. |
| 2009/0174672 A1 | 7/2009 | Schmidt |
| 2009/0178913 A1 | 7/2009 | Peterson et al. |
| 2009/0188374 A1 | 7/2009 | Folkesson |
| 2009/0189790 A1 | 7/2009 | Peterson |
| 2009/0189873 A1 | 7/2009 | Peterson |
| 2009/0210568 A1 | 8/2009 | Peterson et al. |
| 2009/0231113 A1* | 9/2009 | Olien et al. ............... 340/407.2 |
| 2009/0267921 A1 | 10/2009 | Pryor |
| 2009/0303187 A1 | 12/2009 | Pallakoff |
| 2010/0045612 A1 | 2/2010 | Moelne |
| 2010/0108408 A1 | 5/2010 | Colgate et al. |
| 2010/0130280 A1 | 5/2010 | Arezina et al. |
| 2010/0160016 A1 | 6/2010 | Shimabukuro et al. |
| 2010/0171715 A1 | 7/2010 | Peterson |
| 2010/0177050 A1 | 7/2010 | Heubel et al. |
| 2011/0073454 A1 | 3/2011 | Chen et al. |
| 2011/0227763 A1 | 9/2011 | Schlosser et al. |

FOREIGN PATENT DOCUMENTS

| | | |
|---|---|---|
| DE | 10126670 | 12/2002 |
| DE | 2005002417 | 4/2005 |
| DE | 2004005501 | 8/2005 |
| EP | 0654727 | 5/1995 |
| EP | 1310860 | 5/2003 |
| EP | 1548776 | 6/2005 |
| JP | 61000825 A | 1/1986 |
| WO | WO-0191100 | 11/2001 |
| WO | WO-2009043605 | 4/2009 |
| WO | WO-2009097358 | 8/2009 |
| WO | WO-2009097359 | 8/2009 |
| WO | WO-2009097361 | 8/2009 |
| WO | WO-2009114827 | 9/2009 |

OTHER PUBLICATIONS

Bark, Karlin "Functional Prototype I", Retrieved from <http://bdml.stanford.edu/twiki/bin/view/Haptics/FunctionalPrototypeI?skin=print.pattern>, (Aug. 9, 2005),3 pages.

Wing, Alan et al., "Multidimensional Haptics Preliminary Report", Retrieved from <http://www.touch-hapsys.org>, (Sep. 21, 003),pp. 1-125.

Wu, Xingtao et al., "A generalized Capacitance-Based Model for Electrostatic Micro-Actuators", Department of Physics, New Jersey Institute of Technology, Newark, NJ, 07102-1982 Department of Mechanical Engineering, Columbia University, NY 10027,pp. 1-23.

Gorinevsky, Dimitry "Adaptive membrane for large lightweight space telescopes", SPIE Astronomical Telescopes and Instrumentation,(2002),pp. 1-9.

Pasquero, Jerome "Stress: A Tactile Display Using Lateral Skin Stretch", Department of Electrical and Computer Engineering McGill University, Montreal,(Oct. 2003),75 pages.

Hollis, Ralph "Haptics", *Bershire Encyclpedia of Human-Computer Interaction*, Berkshire Publishing Group,(2004),pp. 311-316.

Ashley, Steven "Artificial Muscles", *Scientific American*, Availallbe at <www.sciam.com>,(Oct. 2003),pp. 53-59.

"Haptic Touch Technology", Pacinian,(Nov. 2007),2 pages.

Bar-Cohen, Yoseph "Electroactive Polymers", Retrieved from <http://electrochem.cwru.edu/ed/encycl/>, Electrochemistry Encyclopedia,(Dec. 2004),7 pages.

Fontaine, Ebraheem "A Laboratory Demonstration of a Parallel Robotic Mechanism", Massachusetts Institue of Technology,(Jun. 2002),pp. 1-14.

"Elastomers: Powerful Polymer", Retrieved from <http://appliancedesign.com/copyright/>, (Jun. 2006),5 pages.

Bar-Cohen, Yoseph "Worldwide Electroactive Polymers", (*Artificial Muscles*) *Newsletter*, vol. 7, No. 2, Available at <http://eap.jpl.nasa.gov>,(Dec. 2005),pp. 1-16.

Bifano, Thomas "Parallel Plate Electrostatic Actuation for High-Resolution Deformable Mirrors", Boston University,(Aug. 19, 2004),35 pages.

Pasquero, Jerome "Survey on Communication Through Touch", *Technical Report: TR-CIM 06.04*, Center for Intelligent Machines Department of Electrical and Computer Engineering,(Jul. 2006),pp. 1-27.

"Touch and Haptics", *2004 IEEE/ RSJ International Conference on Intelligent Robots and Systems*, (Sep. 28, 2004),32 pages.

O'Halloran, A et al., "Materials and Technologies for Artificial Muscle: A Review for the Mechatronic Muscle Project", *Topics in Bio-Mechanical Engineering, Chapter 7*, Department of Electronic Engineering, National University of Ireland Galway,(2004),pp. 184-215.

Biggs, James "Some Useful Information for Tacttile Display Design", *IEEE Transactions on Man-Machine Systems*, vol. 11, No. 1,(1970),pp. 19-24.

Raisamo, Roope "Tactile User Interfaces", New Interaction Techniques,(Aug. 2, 2001),30 pages.

Bar-Cohen, Yoseph "Low Mass Muscle Actuators (LoMMAs)", Telerobotic Task Sponsered by NASA HQ, Code S,(Oct. 23, 1997),18 pages.

"Role of Skin Biomechanics in Mechanoreceptor", Retrieved from <http://touchlab.mit.edu/oldresearch/currentwork/humanhaptics/roleofskinbiomechanics/> on Dec. 20, 2007, MIT Touch Lab,(Dec. 20, 2007),pp. 1-13.

Spires, Shelby "Artificial Strongman", *Smart Business: For the New Economy*, (Nov. 2000),1 page.

Bar-Cohen, Yoseph "Electric Flex", *IEEE Spectrum Online*, (Jun. 2004),6 pages.

Bar-Cohen, Yoseph "Electroactive Polymers as Artificial Muscles-Capabilities, Potentials and Challenges", *Robotics 2000*, Available at <www.spaceandrobotics>,(Feb. 28-Mar. 2, 2000),pp. 1-8.

Carpi, Federico et al., "Dielectric Elastomers as Electromechanical Transducers: Fundamentals, Materials, Devices, Models and Applications of an Emerging Elecrotative Polymer Technology", *Elsevier LTD.*, (2008),12 pages.

"Non final OA", U.S. Appl. No. 11/945,879, (Feb. 13, 2009).

Hayward, Vincent et al., "Tactile Display Device Using Distributed Lateral Skin Stretch", *Proceedings of the Haptic Interfaces for Virtual Environment and Teleoperator Systems Symposium*, ASME International Mechanical Engineering Congress & Exposition,(2000),pp. 1309-1314.

Seeger, Joseph et al., "Dynamics and Control of Parallel-Plate Actuators Beyond the Electrostatic Instability", *Transducers 99 the 10th Interrnational Conference on Solid State Sensors and Actuators*, (Jun. 1999),pp. 474-477.

"Nanoactuators Based on Electrostatic Forces on Dieletrics", Retrieved from <http://www.nasatech.com/Briefs/Apr05/NPO30747.html> on Nov. 28, 2005, NASA's Jet Propulsion Laboratory, Pasadena, CA,4 pages.

Pei, Qibing et al., "Multiple-Degrees-of-Freedom Electroelastomer Roll Actuators", *SRI International Institute of Physics Publishing*, (2004),pp. N86-N92.

"New SRI International sSpin-Off, Artificial Muscle, Inc., Secure Series a Funding from Leading VC Firms", Retrieved from <http://www.sri.com/news/releases/05-03-04.html> on Jan. 30, 2008, SRI International Spin Offs Artificial Muscle, Inc,(May 2004),2 pages.

Jager, Edwin et al., "Microfabricating Conjugated Polymer Actuators", *Science Magazine*, vol. 290, www.sciencemag.org,(Nov. 24, 2000),pp. 1540-1544.

"Non Final Office Action", U.S. Appl. No. 11/945,879, (Feb. 13, 2009),8 pages.

Bar-Cohen, Y. "Electroactive Polymer (EAP) Actuators as Artificial Muscles—Reality, Potential and Challenges", *SPIE Press*, (Mar. 18, 2004),pp. 26 and 548-550.

Van De Mortel, Dirk "Exploration of Smart Materials for the Use of User-System Interaction", *User System Interaction. Faculty Industrial Design. TU/e*, (Apr. 2002),pp. 21-24.

"Non Final Office Action", U.S. Appl. No. 11/945,879, (Jul. 9, 2009),16 pages.

"PCT Search Report", Application Serial No. PCT/US2009/037191, (May 28, 2009),108 pages.

"PCT Search Report", Application Serial No. PCT/US2009/032288, (Apr. 29, 2009),33 pages.

"PCT Search Report", Application Serial No. PCT/US2009/032292, (Aug. 11, 2009),17 pages.

"PCT Search Report", Application No. PCT/US2009/032289, (Dec. 23, 2009),13 pages.

"Notice of Allowance", U.S. Appl. No. 11/945,879, (Feb. 23, 2010),6 pages.

"PCT Search Report and Written Opinion", Application No. PCT/US2010/020380, (Apr. 12, 2010),13 pages.

"Supplemental Notice of Allowance", U.S. Appl. No. 11/945,879, (May 20, 2010),5 pages.

"Final Office Action mailed Nov. 8, 2011", U.S. Appl. No. 12/360,265, 11 pages.

"Final Office Action mailed Nov. 22, 2011", U.S. Appl. No. 12/371,301, 6 pages.

"Non-Final Office Action mailed Oct. 13, 2011", U.S. Appl. No. 12/791,630, 5 pages.

"Non-Final Office Action mailed Dec. 14, 2010", U.S. Appl. No. 12/360,316, 7 pages.

"Non-Final Office Action mailed Apr. 1, 2011", U.S. Appl. No. 12/371,301, 4 pages.

"Non-Final Office Action mailed May 12, 2011", U.S. Appl. No. 12/360,265, 7 pages.

"Notice of Allowance mailed Oct. 3, 2011", U.S. Appl. No. 12/360,316, 4 pages.

"Notice of Allowance and Fees Due" mailed Jan. 30, 2012, U.S. Appl. No. 12/360,316, 8 pages.

\* cited by examiner

VECTOR-SPECIFIC HAPTIC FEEDBACK

RELATED APPLICATION

This application claims priority to U.S. Provisional Application No. 61/036,735, filed on Mar. 14, 2008, the disclosure of which is incorporated by reference herein in its entirety.

BACKGROUND

Current video game controllers, hand-held gaming device components, mice, and other types of user interface devices (UIDs) are limited in the haptic feedback they provide to users. This is because typically, these UIDs are configured with actuators employing an off-center, rotating, mass on-a-spring type technology that produces a non-specific or indiscriminate vibration. As such, these UIDs offer a relatively limited user sensory experience with a limited correlation with what a user experiences when they interact with a device and/or application. Furthermore, these types of actuators are relatively inefficient with respect to their power consumption and are typically associated with a relatively slow haptic feedback response time.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one or more embodiments, vector-specific movement can be imparted to a user interface device (UID) to provide vector-specific haptic feedback. In at least some embodiments, this vector-specific movement can be based on input received by the UID from an associated device. This input can include information about an event associated with a user's interaction with the associated device and/or an application implemented on the associated device.

In at least some embodiments, the UID can be a component of, or otherwise integrated with, the associated device. Alternatively or additionally, the UID can be separate from, and communicatively linked with, the associated device.

In at least some embodiments, the UID can be configured with a controller, a microprocessor(s), and a vector-specific actuator that includes an electrically-deformable material. The controller can receive the input and utilize the input to determine and specify a direction and/or magnitude of vectored movement to be imparted to the UID.

In one or more embodiments, the electrically-deformable material can be an electroactive polymer (EAP) which undergoes a deformation when a drive voltage(s) is applied to it. Alternatively or additionally, the electrically-deformable material can be an electrostatic material forming a structure which, by virtue of its shape, undergoes a deformation when a drive voltage(s) is applied to it.

BRIEF DESCRIPTION OF THE DRAWINGS

The same numbers are used throughout the drawings to reference like features.

DETAILED DESCRIPTION

Overview

In one or more embodiments, vector-specific movement can be imparted to a user interface device (UID) to provide vector-specific haptic feedback. In at least some embodiments, this vector-specific movement can be based on input, e.g., a signal, received by the UID from an associated device. This input can include information about an event associated with a user's interaction with the associated device and/or an application implemented on the associated device. By virtue of the vector-specific nature of the haptic feedback, the user can be provided with a realistic sensory experience.

In at least some embodiments, the UID can be a component of, or otherwise integrated with, the associated device. For example, the UID can be integrated with a hand-held computing device on which an application such as a video game is implemented. Alternatively or additionally, the UID can be separate from and communicatively linked with the associated device. For example, the UID might be a video game controller that is communicatively linked with a computing device on which the application is implemented. As another example, the UID might be a remote controller device configured to allow remote control of an associated device such as a vehicle, robotic device, or the like.

Consider, for instance, a scenario where the user is controlling a virtual character in a video game via the UID. Input associated with and describing a virtual event in the game, such as the virtual character being struck by a projectile, running, firing a weapon, driving a vehicle, etc., can be received by the video game controller and utilized to impart vector-specific movement to the UID that correlates with the virtual event.

In at least some embodiments, the UID can be configured with a controller, a microprocessor(s), and a vector-specific actuator that includes an electrically-deformable material. The controller can receive the input and utilize the input to determine and specify a direction and/or magnitude of vectored movement to be imparted to the UID.

In one or more embodiments, the electrically-deformable material can be an electroactive polymer (EAP) which undergoes a deformation when a drive voltage(s) is applied to it. Alternatively or additionally, the electrically-deformable material can be an electrostatic material forming a structure (s) which, by virtue of its shape, undergoes deformation when a drive voltage(s) is applied to it.

In the discussion that follows, a section entitled "Example System" is provided and describes a system that can be used in accordance with one or more embodiments. Next, a section entitled "Example Vector-Specific Actuators" is provided and describes two example vector-specific actuators, in accordance with one or more embodiments. Lastly, a section entitled "Example Method" is provided and describes a method in accordance with one or more embodiments.

Example System

Figure 1:
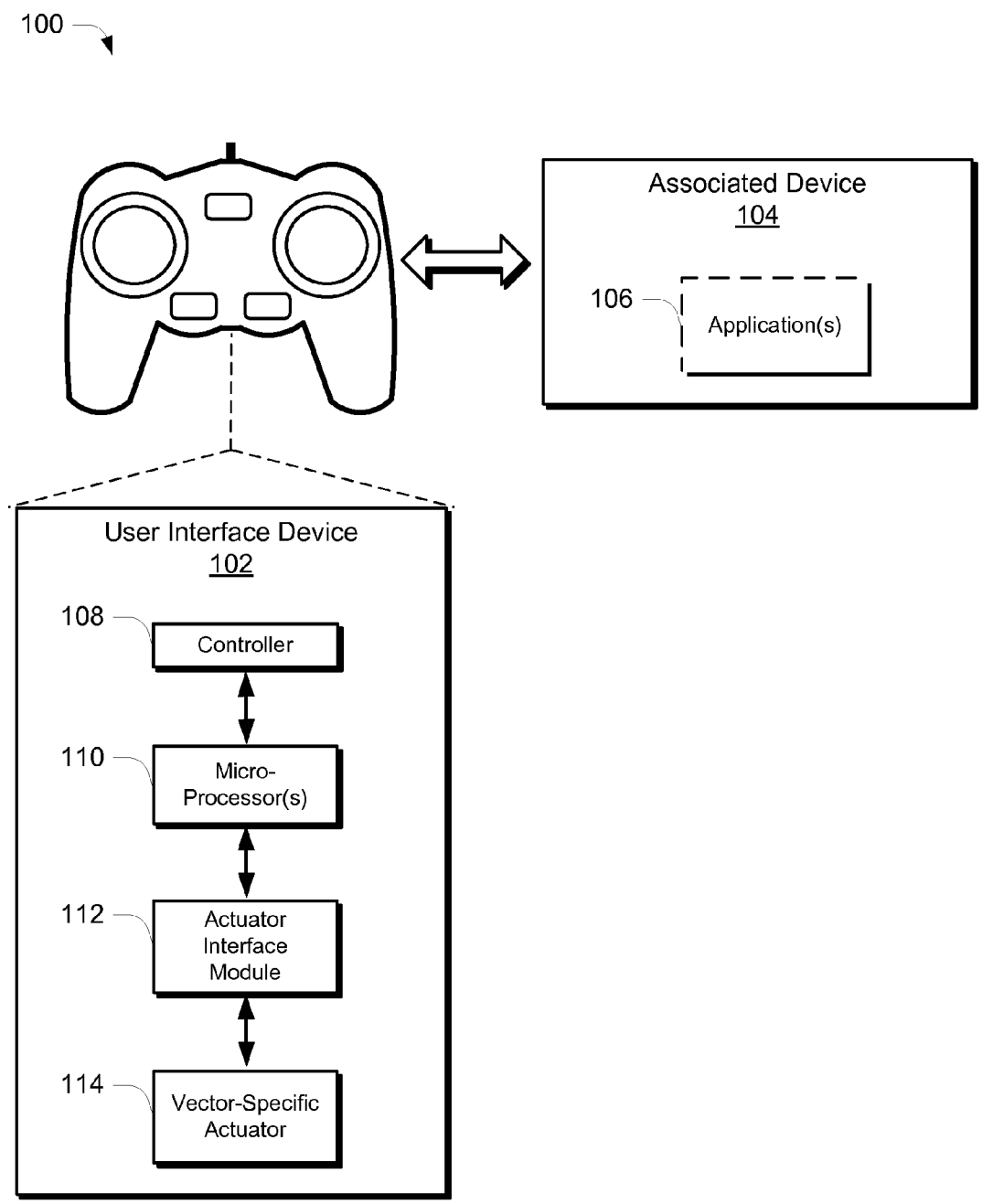
FIG. 1 illustrates an example system in accordance with one or more embodiments.

FIG. 1 illustrates an example system in accordance with one or more embodiments, generally at 100. In this example, system 100 includes a UID 102 and an associated device 104 which is or can be communicatively linked with UID 102 via a wired and/or wireless connection. For ease of illustration and discussion, UID 102 and associated device 104 are shown here as being separate devices. However, it is to be appreciated and understood that in at least some embodiments, UID 102 can be a component of, or otherwise integrated with, associated device 104 without departing from the spirit and scope of the claimed subject matter.

UID 102 can be any suitable type of device configured to provide haptic feedback to a user via vector-specific movement. By way of example and not limitation, a suitable device can include a game controller, hand-held computing device component, mouse, key or keyboard element, PDA component, smart phone component, remote or non-remote controller device, steering device, and the like.

Associated device 104, in turn, can be any suitable type of device configured to allow a user to interact with it such as, without limitation, a hand-held computing device, laptop computing device, desktop computing device, personal digital assistant (PDA), smart phone, remotely controlled device, and the like. In at least some embodiments, associated device 104 can be utilized to implement one or more applications 106, such as a video game, user interface, simulator, and the like.

As described above, UID 102 and associated device 104 are or can be communicatively linked with one another. As such, input from associated device 104 can be received by UID 102. This input can include information about a virtual or non-virtual event associated with a user's interaction with associated device 104. More particularly, this can include information indicating that an event has occurred, descriptive information about the event, and/or instructions for a vectored movement to be provided in response to the event. Without limitation, descriptive information might describe an event's acceleration, magnitude, timing, direction, or the like, while the instructions might specify one or movement parameters to be imparted to the UID.

UID 102, in this example, includes a controller 108, one or more microprocessors 110, an actuator interface module 112, and a vector-specific actuator 114. These various components can be implemented in connection with any suitable hardware, software, firmware, or combination thereof such as, without limitation, an application specific integrated circuit for example. In operation, controller 108 can be configured to receive the input and utilize the input to determine appropriate drive parameters for the vectored movement to be imparted to UID 102. Controller 108 can accomplish this by parsing, analyzing, or performing any other suitable function or functions sufficient to derive, ascertain, or otherwise determine the drive parameters from information found in the input. For example, controller 108 might utilize an algorithm and/or other type of instructions to accomplish this. These drive parameters can specify timing information, e.g., a start time and/or duration for the vectored movement. In addition, these drive parameters can also specify a direction and/or magnitude for the vectored movement. As such, and by virtue of vector-specific actuator 114, this vectored movement can be imparted in a vector-specific manner that correlates with the event.

In addition, in at least some embodiments, controller 108 can also be configured to utilize other information to determine the drive parameters. As one example, consider a scenario where UID 102 is configured with one or more sensors, such as an accelerometer and/or gyroscope, capable of providing information associated with the UID's orientation. Now assume that input is received by controller 108 that specifies that vectored movement is to be provided in a direction to the left of UID 102 in its upright position. Utilizing the input information and the information associated with the orientation of UID 102, controller 108 can make an appropriate determination, based on the UID's current orientation, as to which direction UID 102 is to be moved.

To assist the reader in understanding and appreciating the above discussion, consider the scenario described where the user is controlling a virtual character in a video game. For the sake of discussion, assume now that the video game is being implemented on associated device 104 and that the user is interacting with the video game by controlling a virtual character in the game via UID 102. Also assume that the input received by controller 108 includes information that describes the virtual character being struck by a bullet on the character's right side. Controller 108 can utilize the input information, along with information associated with the orientation of UID 102, to determine appropriate drive parameters. These drive parameters can specify a vector-specific movement of UID 102 to the left—according to its current orientation—in order to correspond to the impact of the bullet on the virtual character's right side.

Continuing, once controller 108 has determined the drive parameters, including the direction and/or magnitude of the vectored movement to be imparted, it can specify the parameters to microprocessor(s) 110. More particularly, controller 108 can provide microprocessor(s) 110 with the drive parameters and instruct microprocessor(s) 110 to cause actuator interface module 112 to apply a drive voltage(s) to a region(s) of vector-specific actuator 114 according to the drive parameters. This drive voltage(s) can be sufficient to impart vectored movement to vector-specific actuator 114, and thus to UID 102, according to the drive parameters. For example, in the context of the scenario above where the virtual character in the video game is struck by a bullet, controller 108 can provide microprocessor(s) 110 with the appropriate drive parameters such that leftward vector-specific movement is imparted to vector-specific actuator 114. This, in turn, can cause UID 102 to move to the left such that the user "feels" the impact of the bullet.

Vector-specific actuator 114 can include any suitable material or combination of materials such as, without limitation, an electrically-deformable material, solenoid structure, voice coil, or other suitable responsive material. For example, in at least some embodiments, vector-specific actuator 114 includes an electrically-deformable material, such as an EAP and/or an electrostatic material, such as a conductive metal. In such embodiments, the drive voltage(s) can be applied to a region(s) of the electrically-deformable material, causing it to change shape and move according to one or more vectors having a direction and/or magnitude specified by the drive parameters. This in turn can cause a corresponding vector-specific movement of vector-specific actuator 114 and UID 102.

Here, it should be noted that UID 102 is not limited to providing a single vector-specific movement. As such, a sequence of multiple vector-specific movements (in any direction or directions in the three-dimensional space surrounding and including UID 102) can be provided to UID 102 by vector-specific actuator 114, and/or one or more other coordinated vector-specific actuators. The summation of these vector-specific movements can result in a unique and specialized type movement, and thus haptic effect. Furthermore, in at least some embodiments, the timing of these discrete vector-specific movements can result in at least some of these movements overlapping one another. As a result, a specialized type of haptic feedback can be provided via UID 102.

As an example, again consider the scenario where the user is controlling the virtual character in the video game. For discussion purposes, assume now that the user causes the virtual character to drive a vehicle over a cobblestone road with potholes, while the vehicle is occasionally struck by bullets. By virtue of being able to control the timing, direction and/or magnitude of individual movements in a sequence of vector-specific movements, haptic feedback can be provided via UID 102 that corresponds with individual virtual events of the vehicle being driven. More particularly individual vector-specific movements in the sequence can be provided in an overlapping fashion such that the individual movements correspond to either the vehicle being driven over individual cobblestones, the vehicle being driven over an occasional pothole, or to the occasional impact of a bullet striking the vehicle. As a result, the user can simultaneously experience, via the vector-specific movement of UID 102, haptic feedback that corresponds with each of these virtual events.

Example Vector-Specific Actuators

Figure 2:
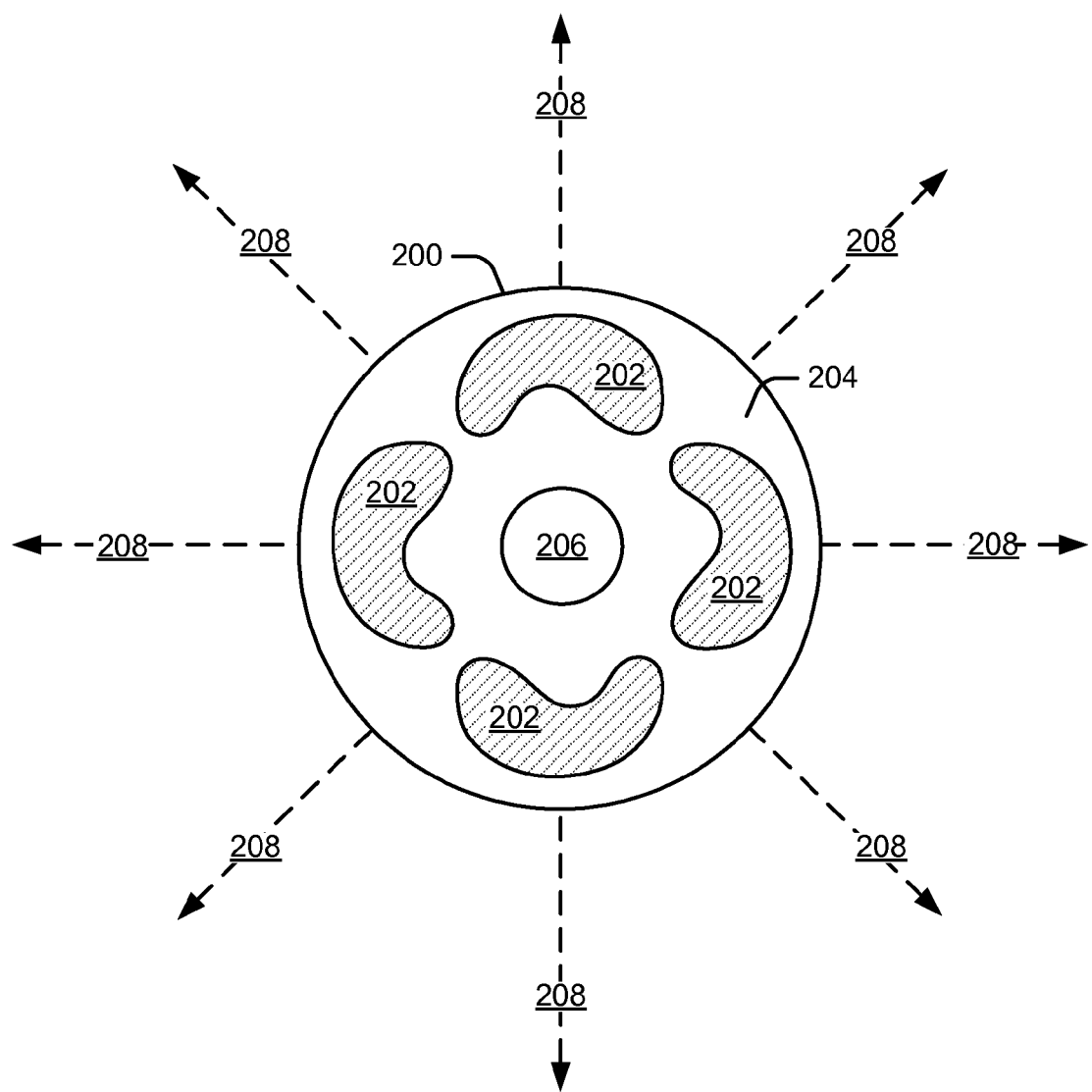
FIG. 2 illustrates an example vector-specific actuator in accordance with one or more embodiments.
Figure 3:
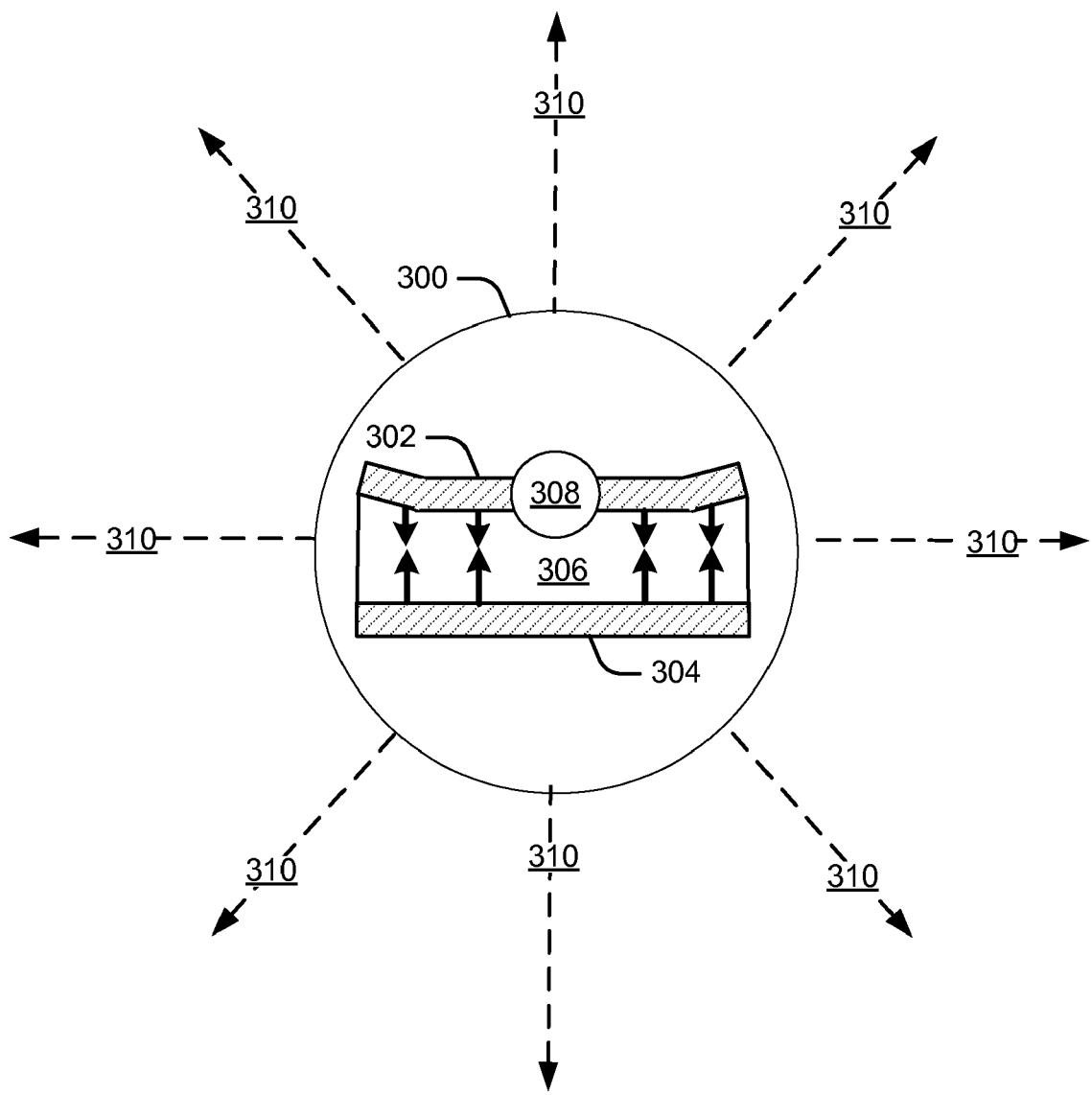
FIG. 3 illustrates an example vector-specific actuator in accordance with one or more embodiments.

To assist the reader in understanding and appreciating utilizing a vector-specific actuator to provide vector-specific movement, FIGS. 2 and 3, and the following discussion are provided. These figures and the accompanying discussion illustrate and describe two example vector-specific actuators, one or both of which may be implemented as an actuator in a system with a UID, such as vector-specific actuator 114 in system 100 for example. However, it is to be appreciated and understood that either of these example vector-specific actuators may also be implemented in a system or systems other than system 100 without departing from the spirit and scope of the claimed subject matter.

FIG. 2 illustrates an example vector-specific actuator, generally at 200, which can be implemented in, and connected to, an associated UID (not shown). In this example, vector-specific actuator 200 includes an electrically deformable material such as EAP. Here, the EAP includes an electrically active area 202 and an electrically inactive area 204 which are connected. In at least some embodiments, vector-specific actuator 200 also includes a mass 206 that is connected to the EAP. Mass 206 can be any type of object(s) having a mass. By way of example and not limitation, mass 206 can be a component(s) of the UID in which the vector-specific actuator is implemented, such as a battery or batteries, housing portion of the associated UID, etc.

EAP refers to a class of polymers which are formulated to exhibit different physical and/or electrical behaviors and properties. EAP is available from various companies such as a company named Artificial Muscle Inc. located in Sunnyvale, Calif. or a company named Danfoss PolyPower A/S located in Nordbord, Denmark. In general, when a drive voltage(s) (e.g., 0-5000 volts) is applied to an electrically active area of an EAP, the EAP changes shape and moves according to a vector having a direction and magnitude that corresponds to the voltage(s) applied and to the region(s) where the voltage(s) is applied.

As such, when a voltage(s) is applied to electrically active area 202, the EAP changes shape and moves in a vector-specific manner. Since mass 206 is connected to the EAP, the movement of the EAP causes a corresponding vector-specific movement of mass 206, and thus vector-specific actuator 200. This vector-specific movement can be in accordance with any vector in the three-dimensional space surrounding and including vector-specific actuator 200, as represented here by example vectors 208. Since vector-specific actuator 200 is connected to the UID, the vector-specific movement is also imparted to the UID. It is to be appreciated and understood that the illustrated layout of the electrically active areas 202 constitutes but one layout. As such, other layout configurations can be utilized without departing from the spirit and scope of the claimed subject matter.

FIG. 3 illustrates an example vector-specific actuator, generally at 300, which can be implemented in, and connected to, an associated UID (not shown). Here, vector-specific actuator 300 includes an electrically deformable material that is an electrostatic material such as, without limitation, a conductive metal, a composite material coated with a conductive material, or the like. In this example, the electrostatic material forms an electrostatic structure including two electrostatic components 302 and 304 that are positioned proximate one another and separated by one or more dielectric materials 306. Dielectric material(s) 306 can include, without limitation, plastic, polyester film (e.g., MYLAR, MELINEX etc.), rubber, silicone, glue, air, water, dielectric hydraulic fluid, mineral oil, or any combination thereof. In at least some embodiments, vector-specific actuator 300 also includes a mass 308 that is connected to one of the electrostatic components—here, electrostatic component 302. As with mass 206 illustrated and described above, mass 308 can be any type of objects(s) having a mass such as, without limitation, a battery or batteries, housing portion of the UID, etc.

In operation, when a drive voltage(s) (e.g., 0-5000 volts) is applied to components 302 and 304, these components become electrostatically attracted to one another, causing at least one of these components to move generally toward the other component. As a result, the electrostatic structure generally changes shape and moves according to a vector having a direction and magnitude that corresponds to the voltage applied and to the structure's shape. Since mass 308 is connected to component 302, this movement causes a corresponding vector-specific movement of mass 308, and thus vector-specific actuator 300. This vector-specific movement can be according to any vector in the three-dimensional space surrounding and including vector-specific actuator 300, as shown here by example vectors 310. Since vector-specific actuator 300 is connected to the UID, the vector-specific movement is also imparted to the UID.

Example Method

Figure 4:
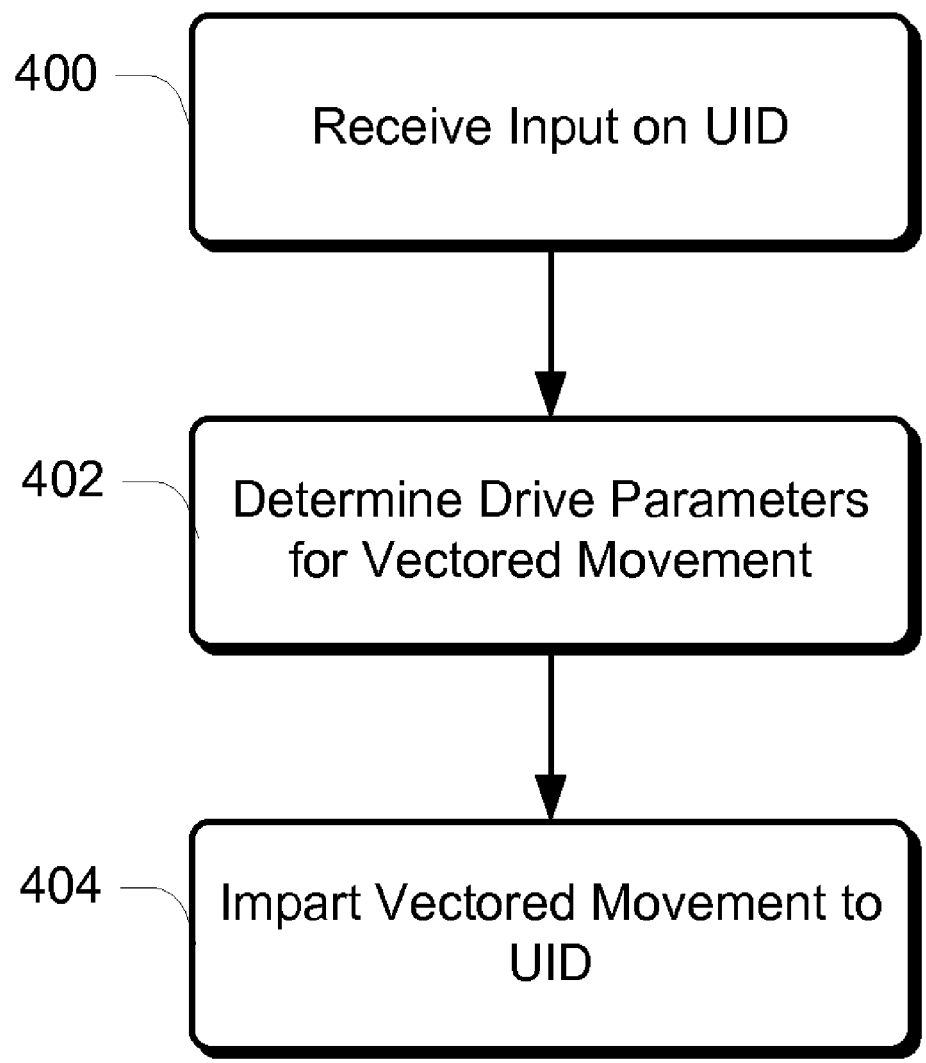
FIG. 4 is a flow diagram that describes steps in a method in accordance with one or more embodiments.

FIG. 4 is a flow diagram that describes steps of a method in accordance with one or more embodiments. The method can be implemented in connection with any suitable hardware, software, firmware, or combination thereof. Furthermore, one or more of the steps of the method can be repeated any number of times. In at least some embodiments, the method can be implemented by a system, such as example system 100 illustrated and described above. However, it is to be appreciated and understood that the described method can be implemented by systems other than system 100 without departing from the spirit and scope of the claimed subject matter.

Step 400 receives an input on a UID. As illustrated and described above, in at least some embodiments, this input can pertain to an event associated with a user's interaction with a device other than the UID. This can include a virtual event, such as one occurring in a video game for example. Alternatively or additionally, this can include a non-virtual event. As an example, consider a scenario where the user is utilizing the UID to control an apparatus, such as a remote control vehicle, robotic device, or the like. A non-virtual event associated with the apparatus, such as the apparatus colliding with a structure for instance, might be described or otherwise addressed by information of the input.

After receiving the input at step 400, step 402 utilizes the input to determine drive parameters for vectored movement to be imparted to the UID. As explained and illustrated above, in addition to timing information, these drive parameters can also specify a direction and/or magnitude for the vectored movement.

Responsive to receiving the input at step 400, vector-specific movement is imparted to the UID at step 404. As illustrated and described above, in at least some embodiments, this includes applying a particular drive voltage(s) to a particular region(s) of a vector-specific actuator of the UID according to the drive parameters. As a result, vectored movement is imparted to the vector-specific actuator, and thus to the UID, along a vector having the direction and/or magnitude specified in the drive parameters. As such, the user can be provided with vector-specific haptic feedback.

Conclusion

In one or more embodiments, vector-specific movement can be imparted to a user interface device (UID) to provide vector-specific haptic feedback. In at least some embodiments, this vector-specific movement can be based on input received by the UID from an associated device. The input can include information about an event associated with a user's interaction with the associated device and/or an application implemented on the associated device. As a result of the vector-specific nature of the haptic feedback, the user can be provided with a realistic sensory experience.

In at least some embodiments, the UID can be a component of, or otherwise integrated with, the associated device. Alternatively or additionally, the UID can be separate from and communicatively linked with the associated device.

In at least some embodiments, the UID can be configured with a controller, a microprocessor(s), and a vector-specific actuator that includes an electrically-deformable material. The controller can receive the input and utilize it to determine and specify a direction and/or magnitude of vectored movement to be imparted to the UID.

In one or more embodiments, the electrically-deformable material can be an electroactive polymer (EAP) which undergoes a deformation when a drive voltage(s) is applied to it. Alternatively or additionally, the electrically-deformable material can be an electrostatic material forming a structure(s) which undergoes deformation when a drive voltage(s) is applied to it.

While various embodiments have been described in language specific to structural features and/or methodological steps, it is to be appreciated and understood that the embodiments defined in the appended claims are not necessarily limited to the specific described features or steps. Rather, the specific features and steps are disclosed as example forms of implementing the claimed embodiments.

What is claimed is:

1. A method comprising:
    receiving, on a user interface device (UID), an input, the input including event-associated information, the event-associated information based on a user's interaction with an application implemented on another device;
    responsive to receiving the event-associated information of the input, determining one or more directions representative of the user's interaction with the application and one or more magnitudes representative of the user's interaction with the application;
    responsive to determining, imparting one or more vector-specific movements to the UID via an electrically-deformable material associated with the UID, the imparted one or more vector-specific movements correlating to the determined one or more directions and the determined one or more magnitudes.

2. The method of claim 1, wherein the UID comprises at least one of: a video game controller, a mouse, a key or keyboard element, or a component of a computing device.

3. The method of claim 1, wherein the UID is selected from a group consisting of a component of the other device, a component integrated with the other device, and a component separate from and communicatively linked with the other device.

4. The method of claim 1, wherein imparting the one or more vector-specific movements to the UID comprises:
    utilizing the event-associated information to determine one or more drive parameters, wherein the one or more drive parameters specify one or both of the direction or the magnitude of the one or more vector-specific movements; and
    applying, in accordance with the one or more drive parameters, one or more drive voltages to the electrically-deformable material.

5. The method of claim 1, wherein one or both of the direction or the magnitude of the one or more vector-specific movements is further based at least in part on information other than the input.

6. The method of claim 5, wherein the information other than the input comprises information associated with the UID's orientation.

7. The method of claim 1, wherein the electrically-deformable material comprises an electroactive polymer.

8. The method of claim 1, wherein the electrically-deformable material comprises an electrostatic material.

9. The method of claim 1, wherein imparting the one or more vector-specific movements to the UID comprises imparting a plurality of individual vector-specific movements, at least two of which overlap.

10. A user interface device comprising;
    a controller configured to receive an input, the input including information about an event associated with an application implemented on a device communicatively linked with the user interface device;
    an actuator interface module configured to apply one or more drive voltages to one or more regions of a vector-specific actuator;
    the vector-specific actuator configured to impart one or more vector-specific movements to the user interface device, the one or more vector-specific movements correlating with the event associated with the application implemented on the communicatively linked device;
    an electrically-deformable material associated with the controller and configured to be electrically driven to impart vector-specific movement to the user interface device, wherein one or both of a direction or a magnitude of the vector-specific movement is based at least in part on the input.

11. The user interface device of claim 10, wherein the user interface device is selected from a group consisting of a video game controller, a mouse, a key or keyboard element, and a component of a computing device.

12. The user interface device of claim 10, wherein one or more vector-specific movements impart a plurality of individual vector-specific movements, at least two of which overlap.

13. The user interface device of claim 10, wherein the controller is further configured to utilize the input to determine one or more drive parameters, wherein the one or more drive parameters specify at least one of the direction, the magnitude, a start time, or a duration time of the vector-specific movement.

14. The user interface device of claim 10, wherein the actuator interface module is further configured to cause the one or more drive voltages to be applied to the electrically deformable material sufficient to impart the one or more vector-specific movements.

15. The user interface device of claim 10, wherein the electrically-deformable material comprises at least one of an electroactive polymer or an electrostatic material.

16. The user interface device of claim 10, wherein one or both of the direction or the magnitude of the one or more vector-specific movements is further based at least in part on information other than the input, wherein the information other than the input comprises information associated with the user interface device's orientation.

17. The user interface device of claim 10, wherein the information about the event is selected from a group consisting of event acceleration, event magnitude, event timing, and event direction.

18. A system comprising;
a user interface device (UID) configured to be communicatively linked with an associated device and, to be responsive to receiving an event-related input from the associated device, to provide vector-specific haptic feedback via a vectored movement of the UID; and
an electrically-deformable material associated with the UID and configured to be electrically driven to impart the vectored movement based, at least in part, on the event-related input including event information received from the associated device, which is configured to implement one or more user-interaction applications.

19. The system of claim 18, wherein the UID is selected from a group consisting of a video game controller, a mouse, a key or keyboard element, and a component of a computing device.

20. The system of claim 18, further comprising a controller configured to determine, based at least in part on the event-related input including event information, one or more drive parameters, wherein the one or more drive parameters specify one or both of the direction or the magnitude of the vector-specific movement.

21. The system of claim 20, wherein the controller is further configured to cause one or more drive voltages to be applied to the actuator according to the one or more drive parameters.

22. The system of claim 18, wherein the electrically-deformable material comprises at least one of an electro active polymer or an electrostatic material.

23. The system of claim 18, wherein the one or more user-interaction applications is selected from a group consisting of a video game, a user interface, and a simulator.

24. A system comprising:
a user interface device (UID) configured to provide vectored movement responsive to receiving an input, the input comprising information about an event associated with an application implemented on a device communicatively linked with the UID;
an electrically-deformable material associated with the UID and responsive to one or more drive voltages being applied to the electrically-deformable material; and
a vector-specific actuator configured to impart the vectored movement to the UID, the vectored movement correlating with the event associated with the application implemented on the communicatively linked device.

25. The system of claim 24, wherein the UID is selected from a group consisting of a video game controller, a mouse, a key or keyboard element, and a component of a computing device.

26. The system of claim 24, wherein the electrically-deformable material comprises an electro active polymer.

27. The system of claim 24, wherein the electrically-deformable material comprises an electrostatic material.

28. The system of claim 24, further comprising a controller configured to determine, based at least in part on the input, one or more drive parameters, wherein the one or more drive parameters specify one or both of a direction or a magnitude of the vectored movement.

29. The system of claim 28, wherein the controller is further configured to cause one or more drive voltages to be applied, in accordance with the one or more drive parameters, to the electrically-deformable material sufficient to impart the vectored movement to the UID.

\* \* \* \* \*